United States Patent Office 2,798,879
Patented July 9, 1957

2,798,879

19-NORTESTOSTERONE ACYLATES AND 3-ENOL ACYLATES THEREOF

Robert A. Donia, Kalamazoo Township, Kalamazoo County, and Arnold C. Ott, Kalamazoo, Mich., assignors to The Upjohn Company, Kalamazoo, Mich., a corporation of Michigan No Drawing. Application April 15, 1953,
Serial No. 349,096

10 Claims. (Cl. 260—397.4)

The present invention pertains to steroid compounds related to testosterone, and is more particularly concerned with novel 19-nortestosterone 17-acylates and the 3-enol acylates thereof.

In the present invention, the 19-nortestosterone 17-acylates may be represented by the formula:

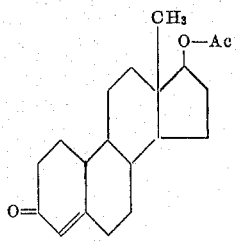

Ac being the acyl radical of an organic carboxylic acid. Of particular interest are the compounds wherein Ac is an acyl radical of a hydrocarbon monocarboxylic acid containing from two to eight carbon atoms, inclusive, the preferred hydrocarbon monocarboxylic acids being the alkanoates and the cycloalkylalkanoates.

It is an object of this invention to provide novel 19-nortestosterone 17-acylates and 3-enol acylates thereof which have anabolic activity and a high ratio of anabolic activity to androgenic activity. These compounds are also useful in the purification of 19-nortestosterone, which may be recovered in purified form from these compounds by hydrolysis of the 17-acylate and the 3-enol acylate. Other objects and uses will be apparent to one skilled in the art.

It is known that testosterone and its esters, and certain closely related compounds, have an anabolic effect in addition to androgenic effect, the anabolic effect being evidenced by such observations as conversion of fat to protein, increased deposition of protein in muscles, increased body weight and organ weight, more rapid skeletal growth, etc. A number of these prior art compounds have been used for their anabolic activity, for example, in the treatment of breast cancer, but the accompanying masculinizing effects due to the low ratio of anabolic activity to androgenic activity is undesirable and imposes obvious limitations on their use for this purpose, especially in the treatment of females. Apparently 17-methyl-5-androstene-3$\beta$,17$\beta$-diol is one of the best anabolic agents which is structurally related to testosterone, since it is commercially available as an anabolic agent. However, this compound has a low ratio of anabolic activity to androgenic activity requiring administration in low dosages to avoid androgenic side reactions. [Gordon et al, J. Clin. End. 11, 209 (1951); Cancer, 5, 271 (1952)].

It has been found that the 19-nortestosterone 17-acylates and the 3-enol acylates thereof of the present invention are compounds having high and prolonged anabolic activity and a high ratio of anabolic activity to androgenic activity, entirely unexpected results, since the prior art shows so many examples of closely related compounds which have a low ratio of anabolic activity to androgenic activity.

The important anabolic activity and high ratio of anabolic activity to androgenic activity of the compounds of the present invention are shown in the table which summarizes the results of biological testing of illustrative compounds in comparison with testosterone propionate as a standard with unit value. In each example in the table the androgenic activity is less than that of testosterone propionate, while the anabolic activity is greater, with the exception of 19-nortestosterone 17-trimethylacetate. However, this trimethylacetate, having little, if any, androgenic activity, has a desirable high ratio of anabolic activity to androgenic activity. As a result, in each example there is a many-fold increase in the ratio of anabolic activity to androgenic activity over this ratio for testosterone propionate. The unusually high activity of certain of these compounds is demonstrated by the 17-propionate and 17-($\beta$-cyclopentylpropionate) of 19-nortestosterone, the required dose of these compounds being only about one-half of the dose of testosterone propionate to produce the same anabolic effect.

TABLE

| Test Compound | Potency Ratio of Test Compound to Testosterone Propionate | | Ratio of Anabolic to Androgenic Activity | Relative Weights of Test Compounds Producing Equal Anabolic Effects |
|---|---|---|---|---|
| | Androgenic Activity | Anabolic Activity | | |
| Testosterone Propionate (Standard) | 1.0 | 1.0 | 1.0 | 1.0 |
| 19-Nortestosterone 17-propionate | 0.4 | 2.6 | 6.3 | 0.4 |
| 19-Nortestosterone 17-($\beta$-cyclopentyl-propionate) | 0.2 | 2.1 | 9.6 | 0.5 |
| 19-Nortestosterone 17-trimethylacetate | <0.02 | 0.2 | >9.0 | 5.5 |

In the table, "Potency Ratio of Test Compound to Testosterone Propionate" was determined by the method of Irwin [Supplements to the Journal of the Royal Statistical Society, vol. IV, No. 1, page 1 (1937)] from dose-response curves, using one curve for each type of activity of each test compound, the amount of activity, or response, being plotted against the amount, or dose, of test compound used for each of several dosage levels. The experimental data used for plotting the dose-response curves was obtained by administering the test compounds in equal daily doses, each contained in 0.1 milliliter of cottonseed oil, subcutaneously to rats, castrated at a body weight of 40 to 45 grams, for 21 days beginning on the day following castration, using at least five rats for each dosage level of each compound; and, at antopsy on the day following the last injection, determining the body weight, seminal vesicle weight, and levator ani muscle weight; the weight of the seminal vesicle per 100 grams of body weight being used as an index of androgenic activity, and the weight of the levator ani muscle per 100 grams of body weight being used as an index of anabolic activity.

The 19-nortestosterone 17-acylates and 3-enol acylates thereof of the present invention are prepared by acylation of 19-nortestosterone using an acylating agent such as, for example, an acid, acid anhydride, acid halide, ester of an acid with a lower alcohol, ketene, etc., according to prior art procedure for converting an alcoholic hydroxy group to an ester and a ketone group to an enol ester, the isolation and purification also being conducted by conventional procedure. The 19-nortestosterone 17-acylates also are obtained by partial hydrolysis of 3-enol acylates of 19-nortestosterone 17-acylates.

The following examples are illustrative of the products of the present invention, but are not to be construed as limiting.

Example 1.—19-nortestosterone 17-propionate

A mixture of 2.5 grams of 19-nortestosterone [Birch, J. Chem. Soc., 367 (1950)], five milliliters of pyridine, and 1.7 milliliters of propionic anhydride is heated at a temperature of about 75 degrees centigrade for about three hours, and, after cooling, is maintained at room temperature (between about twenty and about thirty degrees centigrade) for about sixteen hours. On dilution of the resulting solution with water, and cooling to a temperature below about ten degrees centigrade, the desired 19-nortestosterone 17-propionate separates as an oil which slowly crystallizes; yield 2.85 grams or 95 percent of the theoretical amount. Recrystallization of the product from dilute aqueous methanol gives 19-nortestosterone 17-propionate as pale tan hexagonal plates; yield 2.55 grams, melting point 47.0 to 48.5 degrees centigrade. Further recrystallization of the product using isopropyl ether gives 1.1 grams; melting point 55 to 60 degrees centigrade; specific rotation $[\alpha]_D^{23}$ plus 41 degrees (chloroform); ultraviolet light absorption $\lambda_{max}$ 240 m$\mu$, $\epsilon$ 16,650.

*Analysis.*—Calculated for $C_{21}H_{30}O_3$: C, 76.32; H, 9.15. Found: C, 76.57; H, 9.45.

Heating the 19-nortestosterone 17-propionate under reflux with propionic anhydride and a catalytic amount of para-toluenesulfonic acid, using toluene as a solvent, for a period of several hours, cooling and diluting the resulting solution with cold water, and filtering the solid obtained, provides the 3-enol propionate of 19-nortestosterone 17-propionate. 19-nortestosterone is converted to the 3-enol propionate of 19-nortestosterone 17-propionate in one step by using 19-nortestosterone in place of its 17-propionate ester in the preceding process. Other 3-enol acylates of 19-nortestosterone 17-propionate such as, for example, the acetate, trimethylacetate, β-cyclopentylpropionate, and the like, are obtained in the same manner using the appropriate acylating agent. Partial hydrolysis of 3-enol acylates of 19-nortestosterone 17-propionate provides 19-nortestosterone 17-propionate. Complete hydrolysis of said compound produces 19-nortestosterone in purified form.

Example 2.—19-nortestosterone 17-acetate

In the same manner as shown in Example 1, a mixture of 19-nortestosterone, acetic anhydride, and pyridine produces 19-nortestosterone 17-acetate. The 3-enol acetate of 19-nortestosterone 17-acetate is prepared by heating under reflux a mixture of 19-nortestosterone 17-acetate, acetic anhydride, and a catalytic amount of para-toluenesulfonic acid, dissolved in toluene, for about four hours. Dilution of the resulting solution with water and cooling provides the crystalline 3-enol acetate of 19-nortestosterone 17-acetate. Alternatively this 3-enol acetate is obtained directly from 19-nortestosterone by substituting 19-nortestosterone for the 19-nortestosterone 17-acetate in the preceding process, the 17-hydroxy group being acylated in addition to enol acetylation of the 3-ketone group. The 3-enol acetate of 19-nortestosterone 17-acetate melts at 152 to 153 degrees centigrade; $\lambda_{max}$ 235.5 m$\mu$, $\epsilon$ 18,950; $[\alpha]_D^{24}$ plus 24 degrees (chloroform).

*Analysis.*—Calculated for $C_{22}H_{30}O_4$: C, 73.71; H, 8.44. Found: C, 73.73; H, 8.72.

Other 3-enol acylates of 19-nortestosterone 17-acetate such as, for example, the β-cyclopentylpropionate, trimethylacetate, propionate, and the like, are obtained in the same manner using the appropriate acylating agent. Complete hydrolysis of 19-nortestosterone 17-acetate, or enol acylates thereof, provides 19-nortestosterone of high purity.

Example 3.—19-nortestosterone 17-(β-cyclopentylpropionate)

A solution containing 2.5 grams of 19-nortestosterone dissolved in a mixture of 2.5 milliliters of pyridine and ten milliliters of methylene chloride is mixed with 1.6 milliliters of β-cyclopentylpropionyl chloride under an atmosphere of nitrogen at a temperature between about zero and about ten degrees centigrade using an ice-bath for cooling the reaction mixture. The temperature of the resulting solution is maintained at about room temperature (between about twenty and about thirty degrees centigrade) for about four hours, subsequently at about zero degrees centigrade in a refrigerator for about sixteen hours, and finally at about room temperature for about four hours. The resulting yellow solution is mixed with water and the mixture obtained is extracted with methylene chloride. The methylene chloride extract is washed with a one percent aqueous sodium hydroxide solution, then with a dilute aqueous hydrochloric acid solution, and finally with water. The washed extract is then dried over anhydrous sodium sulfate, and, after removal of the drying agent by filtration, the solvent is evaporated to obtain the desired 19-nortestosterone 17-(β-cyclopentylpropionate) as a straw-colored oil. Chromatography of this oil using synthetic magnesium aluminum silicate (Florisil) as the adsorbent and a mixture of acetone and petroleum ether gives purified 19-nortestosterone 17-(β-cyclopentylpropionate), a particularly preferred compound, as a viscous oil after drying under vacuum; yield 3.0 grams or 82 percent of the theoretical amount; ultraviolet light adsorption $\lambda_{max}$ 241 m$\mu$, $\epsilon$ 16,125; specific rotation $[\alpha]_D^{24}$ plus 42 degrees (chloroform).

In the same manner the appropriate acylating agent and 19-nortestosterone provide other similar 17-cycloalkylalkanoates of 19-nortestosterone, including the 17-cyclopentylformate, cyclohexylformate, cyclopentylacetate, cyclobutylformate, α-cyclopentylpropionate, cyclohexylacetate, cyclopropylformate, cycloheptylformate, β-(methylcyclopentyl)-acetate, β-(methylcyclopentyl)-propionate, β-(dimethylcyclopentyl)-propionate, β-cyclobutylpropionate, and other 17-cycloalkylalkanoates. Hydrolysis of these compounds produces high purity 19-nortestosterone.

The 19-nortestosterone 17-cycloalkylalkanoates such as, for example, 19-nortestosterone 17-(β-cyclopentylpropionate), are converted to 3-enol acylates such as, for example, the 3-enol acetate of 19-nortestosterone 17-(β-cyclopentylpropionate), a particularly preferred compound, or the 3-enol β-cyclopentylpropionate of 19-nortestosterone 17-(β-cyclopentylpropionate), in the same manner as shown for the preparation of 3-enol acylates of 19-nortestosterone 17-propionate and 19-nortestosterone 17-acetate in Examples 1 and 2. Other 3-enol acylates of 19-nortestosterone 17-(β-cyclopentylpropionate) include the 3-enol propionate, formate, butyrate, isobutyrate, pentanoate, hexanoate, heptanoate, octanoate and other 3-enol acylates.

Example 4.—19-nortestosterone 17-trimethylacetate

A solution of 2.5 grams of 19-nortestosterone, two milliliters of pyridine, ten milliliters of methylene chloride, and 1.6 milliliters of trimethylacetyl chloride is prepared using an ice-bath to maintain a temperature of between about zero and about ten degrees centigrade. The resulting solution is maintained at room temperature (between about twenty and about thirty degrees centigrade) for about sixteen hours and then diluted with water and extracted with methylene chloride. The methylene chloride extract is washed with one percent aqueous sodium hydroxide solution, then five percent aqueous hydrochloric acid solution, and finally water. The washed extract is dried over anhydrous sodium sulfate, and, after removal of the drying agent by filtration, the solvent is evaporated to obtain the 19-nortestosterone 17-trimethylacetate as an oil. Crystallization of the oil from heptane gives 1.1 grams of flat needles; melting point 100 to 114 degrees centigrade. Recrystallization using a mixture of ether and petroleum ether gives 0.86 gram of desired product; melting point 109 to 114 degrees centigrade. The mother liquors from the above crystallization and recrystallization steps combined are chromatographed over alumina. The eluate obtained using, in succession, a mixture containing equal volumes of petroleum ether and benzene, benzene, and a five percent solution of ether in benzene, is evaporated to dryness, and the residue is recrystallized from a mixture of ether and petroleum ether to give an additional 0.5 gram of 19-nortestosterone 17-trimethylacetate; melting point 113 to 117 degrees centigrade; specific rotation $[\alpha]_D^{23}$ plus 43 degrees (chloroform); ultraviolet light absorption $\lambda_{max}$ 241 m$\mu$, $\epsilon$ 16,650. The melting point of a mixture of the product with the starting 19-nortestosterone is about 92 degrees centigrade, a significant depression of the melting point of the product.

*Analysis.*—Calculated for $C_{23}H_{34}O_3$: C, 77.05; H, 9.56. Found: C, 77.08; H, 9.72.

In the same manner as shown in Examples 1 and 4, the appropriate acylating agent and 19-nortestosterone provide other similar 17-acylates of 19-nortestosterone, including the 17-formate, butyrate, isobutyrate, pentanoate, isopentanoate, hexanoate, heptanoate, octanoate, and other 17-alkanoates.

The 3-enol acylates of 19-nortestosterone 17-trimethylacetate, such as the 3-enol acetate of 19-nortestosterone 17-trimethylacetate, and other 17-alkanoates are prepared in the same manner as shown in Example 2 for the preparation of the 3-enol acetate of 19-nortestosterone 17-acetate and other 3-enol acylates of 19-nortestosterone 17-acetate.

Examples of other 19-nortestosterone 17-acylates of the present invention include the 17-pentenoates, acrylate, methacrylate, and other 17-acylates. Hydrolysis of these acylates produces 19-nortestosterone in purified form. Other 3-enol acylates of 19-nortestosterone 17-acylates include the 3-enol benzoate 17-propionate and other 3-enol acylates of 19-nortestosterone 17-acylates. Partial hydrolysis of these compounds provides 19-nortestosterone 17-acylates.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A compound selected from the group consisting of 19-nortestosterone 17-acylate and the 3-enol acylate thereof, wherein an acylate radical is of the formula AcO, Ac being the acyl radical of a hydrocarbon monocarboxylic acid containing from two to eight carbon atoms, inclusive, and selected from the group consisting of aliphatic and cycloaliphatic hydrocarbon monocarboxylic acids.

2. 19-nortestosterone 17-alkanoate wherein the alkanoate radical is of the formula AcO, Ac being the acyl radical of an alkanoic acid containing from two to eight carbon atoms, inclusive.

3. 19-nortestosterone 17-cycloalkylalkanoate wherein the cycloalkylalkanoate radical is of the formula AcO, Ac being the acyl radical of a cycloalkylalkanoic acid containing from two to eight carbon atoms, inclusive.

4. 19-nortestosterone 17-propionate.

5. 19-nortestosterone 17-trimethylacetate.

6. 19-nortestosterone 17-($\beta$-cyclopentylpropionate)

7. 3-enol acetate of 19-nortestosterone 17-acetate.

8. 3-enol acetate of 19-nortestosterone 17-($\beta$-cyclopentylpropionate).

9. 19-nortestosterone 17-ester of a lower hydrocarbon carboxylic acid wherein the carboxylic acid is selected from the group consisting of aliphatic and cycloaliphatic lower hydrocarbon carboxylic acids.

10. 3-enol ester of the compound of claim 9 wherein the 3-enol ester radical is a lower hydrocarbon carboxylic acid radical.

No references cited.